United States Patent
Onodera et al.

(10) Patent No.: US 6,522,366 B1
(45) Date of Patent: Feb. 18, 2003

(54) DUAL-LOOP PLL CIRCUIT AND CHROMINANCE DEMODULATION CIRCUIT

(75) Inventors: Junichi Onodera, Kanagawa-ken (JP); Nobuyuki Takagi, Kanagawa-ken (JP); Masamichi Nakajima, Kanagawa-ken (JP)

(73) Assignee: Fujitsu General Limited, Kawasaki (JP)

(*) Notice: Subject to any disclaimer, the term of this patent is extended or adjusted under 35 U.S.C. 154(b) by 0 days.

(21) Appl. No.: 09/554,448

(22) PCT Filed: Oct. 30, 1998

(86) PCT No.: PCT/JP98/04915
§ 371 (c)(1),
(2), (4) Date: May 12, 2000

(87) PCT Pub. No.: WO99/34609
PCT Pub. Date: Jul. 8, 1999

(30) Foreign Application Priority Data

Dec. 26, 1997 (JP) .................... 9-369511

(51) Int. Cl.[7] .................................... H04N 9/66
(52) U.S. Cl. ............................ 348/638; 348/727
(58) Field of Search .................... 348/638–641, 348/727, 194, 536, 537, 539, 572, 692, 695, 557; 329/307, 309, 325, 360; H04N 9/66

(56) References Cited

U.S. PATENT DOCUMENTS 4,860,090 A * 8/1989 Murata et al. ........... 358/21 R
5,243,412 A * 9/1993 Goukura et al. ........... 358/19

FOREIGN PATENT DOCUMENTS

| JP | 63-152297 | 6/1988 |
| JP | 3-82291 | 4/1991 |
| JP | 6-327022 | 11/1994 |
| JP | 9-46720 | 2/1997 |
| JP | 9-154152 | 6/1997 |

* cited by examiner

Primary Examiner—Victor R. Kostak
(74) Attorney, Agent, or Firm—Flynn, Thiel, Boutell & Tanis, P.C.

(57) ABSTRACT

A dual-loop PLL circuit is provided with a clamping circuit 12, an A/D conversion circuit 14, a reference color burst outputting circuit 18, a PLL circuit 24, and phase detecting circuit 34. The phase of a reference color burst KK outputted from the circuit 18 is changed at a slice level SL, and the level SL is changed by a reference phase value in the phase detecting circuit 34. The sampling clocks outputted from the PLL circuit 24 to the A/D conversion circuit 14 are converted to a signal of a frequency of 4 Fsc, and the phase of the signal can be changed continuously by using the reference phase value. In addition, since the phase of the sampling clocks can be adjusted to a desired value and the output signal of the A/D conversion circuit 14 can be converted onto a prescribed color difference signal by a signal conversion circuit and outputted, the color difference signals can be demodulated easily with high accuracy.

17 Claims, 5 Drawing Sheets

DUAL-LOOP PLL CIRCUIT AND CHROMINANCE DEMODULATION CIRCUIT

FIELD OF THE INVENTION

The present invention relates to a PLL (Phase-Locked Loop) circuit for generating a sampling clock, which is phase-locked with color burst, for A/D (Analog/Digital) conversion and a chrominance demodulation circuit by using the PLL circuit. The sampling clock generated by the PLL circuit is used for digitalizing the input composite chrominance signal or chrominance signal.

BACKGROUND ART

In a conventional PLL circuit for generating the sampling clock phase-locked with the color burst for A/D conversion, the chrominance sub-carrier is detected during the color burst period; the clock phase-locked with the detected chrominance sub-carrier is generated by controlling the oscillation frequency of VCO (Voltage-Controlled Oscillator); the clock is output, as a sampling clock, to the A/D conversion circuit; the phase of the sampling clock is fine-adjusted by connecting with one another a plurality of delay relays, each delaying by a predetermined amount, in a plurality of stages.

Further, in the conventional way, the chrominance demodulation is made by means of analog demodulation circuit or by digitalizing the analog demodulation circuit.

However, the aforementioned conventional PLL circuit has a problem that the phase of sampling clock is fine-adjusted by connecting a plurality of delay relays, each delaying by a predetermined amount, in a plurality of stages, and so the phase of the sampling clock cannot be varied continuously though it can be fine-adjusted discontinuously.

For instance, the conventional PLL circuit has a problem that it is not suited for accomplishing the demodulation of the color difference signal easily and with a high accuracy.

Further problem of the aforementioned conventional analog demodulation circuit is that such analog circuit picks up the noise intrinsic to the digital circuit when applied to the display such as PDP (Plasma Display Panel) or LCD (Liquid Crystal Display) having digital interface.

Further problem that results from digitalizing a conventional analog demodulation circuit is that the chrominance demodulation and color tone appear somewhat unnatural because of that the phase of the sampling clock for A/D conversion cannot be varied continuously.

For instance, the composite chrominance signal E of NTSC (National TV System Committee) (hereinafter referred to as NTSC signal) is generated by subjecting a chrominance sub-carrier having a frequency of Fsc to 2-phase amplitude quadrature modulation by means of two color difference signals, I and Q, and to frequency multiplication as represented by the following expression.

$$E = Y + I \cdot \cos(2\pi \cdot Fsc \cdot t + 33°) + Q \cdot \sin(2\pi \cdot Fsc \cdot t + 33°) \quad (1)$$

where Fsc represents about 3.58 MHz at (455/2) represents horizontal scanning frequency.

Figure 1:
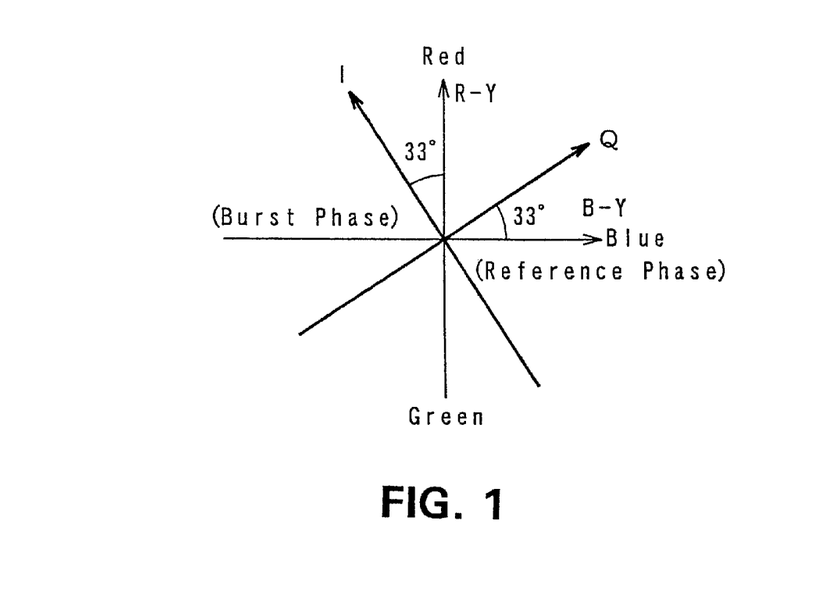
FIG. 1 is an explanatory diagram illustrating the phasic relationship of color difference signals of NTSC signal.

The phasic relationship of the chrominance signal, as NTSC signal, is shown in FIG. 1. In FIG. 1, B-Y and R-Y represent two color difference signals differing from I and Q respectively.

Figure 2:
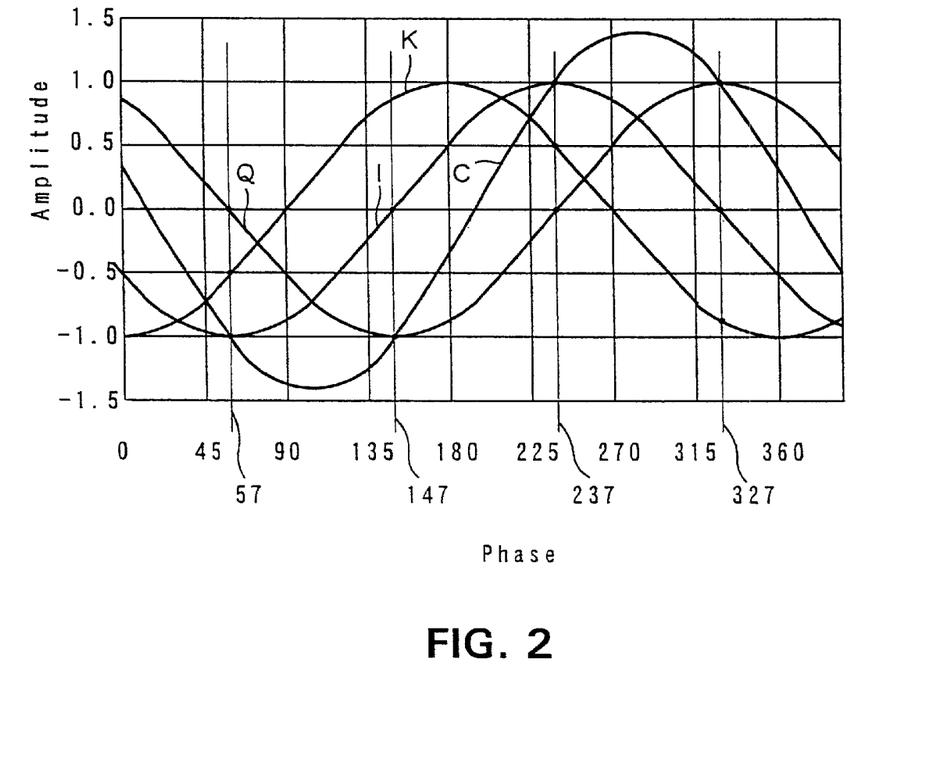
FIG. 2 is a waveform diagram illustrating the phasic relationship among the NTSC color difference signals, I and Q, chrominance signal C (=I+Q) and color burst K.

The color difference signals, I and Q, have phasic relationships with color burst K as are shown in FIG. 2, so that, where the phase differences from the phase reference point (B-Y axis) are 57° and 237°, the amplitudes are −1 and 1 for the color difference signal I and 0 for the color difference signal Q, while, where the phase differences are 147° and 327°, the amplitude of the color difference signal is 0 for the color difference signal I and −1 and 1 for the color difference signal Q. (Maximum amplitudes of I and Q are assumed to be 1 and −1 respectively.) Thus, I component alone or Q component alone can be sampled by sampling the chrominance signal C (=I+Q) at the point where the amplitude of the color difference signal Q or I becomes 0. In other words, by making the sampling by means of the sampling clock having a frequency of 4 Fsc, which is phase-locked to the aforementioned color burst at 57°, the color difference signals I and Q can be demodulated from the signal C easily and with a higher accuracy than that available by the estimation based on the interpolating calculation.

However, with the aforementioned PLL circuit, the phase of the sampling clock cannot be varied continuously, thereby causing a problem that the sampling clock having a frequency of 4 Fsc phase-locked to the aforementioned predetermined phase point (e.g., 57°) of the color burst cannot be generated, and consequently the chrominance signal cannot be demodulated easily and with a high accuracy.

The present invention is made in consideration of the aforesaid problems and for the purpose of providing a PLL circuit capable of continuously varying the phase of the sampling clock for A/D conversion and a chrominance demodulation circuit capable of demodulating color difference signal from a composite video signal with ease and with a high accuracy by using the PLL circuit.

DISCLOSURE OF THE INVENTION

The dual-loop PLL circuit according the present invention comprises a clamping circuit for clamping, for output, the DC level of an input composite chrominance signal or a chrominance signal to a fixed level, an A/D conversion circuit for sampling, for output, the output signal from the clamping circuit, a reference color burst output circuit for comparing, for output, the color burst having a frequency Fsc, out of the output signals from the clamping circuit, with the slice level, a PLL circuit for generating a signal, having a frequency N·Fsc (N=an integral number of times of 4) and phase-locked with the reference color burst by means of oscillation frequency control, for output, as a sampling clock, to A/D conversion circuit, and a phase detection circuit for detecting the phase difference between the sampling clock and the reference color burst on the basis of the level difference between the output signal from the A/D conversion circuit and a predetermined phase reference value and for outputting the slice level corresponding to the slice level to the reference color burst output circuit.

Here, the chrominance signal means a signal subjected to carrier-suppression amplitude modulation by means of 2 chrominance signals and 2 chrominance sub-carriers whose phases are differentiated by 90° from the formers respectively.

The PLL circuit generates a signal having frequency N·Fsc, which is phase-locked with the reference color burst output from the reference color burst output circuit, and outputs the signal, as a sampling clock, to the A/D conversion circuit.

The phase of the color burst output from the reference color burst output circuit is varied at a slice level, while the slice level varies according to the phase reference value in the phase detection circuit. Thus, the sampling clock to be output to the A/D conversion circuit from the PLL circuit is converted into the signal, having frequency NFcs and phase-locked with color burst, and the phase of the signal can be varied continuously according the phase reference value.

For instance, by adjusting the phase at the rising point of the reference color burst so that the phase difference from the phase reference point becomes 57°, the sampling clock for A/D conversion suited for chrominance demodulation can be output.

The reference color burst output circuit comprises a level comparator for comparing the output signal from the clamping circuit with the slice level to output a signal having a rectangular waveform and a burst period sampling circuit for sampling the signal of color burst period out of the output signals from the level comparator. When arranged in this way, the composition of the reference color burst output circuit can be simplified.

The phase detection circuit comprises an adder for adding a phase adjusting value to phase reference value, a comparator for comparing the sum of the adder with the output signal from the A/D conversion circuit during the period predetermined according to the kind of input signal to output the signal corresponding to the level difference and a slice level output circuit for outputting a corresponding slice level according to the output signal from the comparator.

When arranged in this way, the phase of the sampling clock can be intentionally varied from a predetermined value.

Further, the phase detection circuit comprises the phase reference value selection circuit for selectively output the predetermined reference value for NTSC signal or that for PAL signal, the adder for adding a phase adjusting value to the phase reference value output from the phase reference value selection circuit, the comparator, for comparing the sum of the adder with the output signal of the A/D conversion circuit during the period predetermined depending on whether the signal is of NTSC or PAL and outputting a corresponding signal according to level difference, and the slice level output circuit for outputting a corresponding slice level according to the output signal of the comparator. When arranged in this way, in order to enable not only the phase of the sampling clock to be intentionally varied from a predetermined value but also to be applicable to the composite chrominance signal or chrominance signal of both the NTSC system and PAL system.

The slice level output circuit is made to comprise a filter for smoothing, for output, the output signal from the comparator and a pulse width modulation circuit for outputting, as slice level, a corresponding pulse width modulation signal on the basis of the output signal of the filter.

When arranged in this way, the composition of the slice level output circuit can be simplified.

A Chrominance Demodulation Circuit Using the Dual-Loop PLL Circuit relating to the invention comprises a clamping circuit for clamping the DC level of input composite chrominance signal or chrominance signal to a fixed level for output, an A/D conversion circuit for sampling the output signal from the clamping circuit by means of sampling clock to output a digital signal, a reference color burst output circuit for comparing the color burst having a frequency Fsc, out of the output signals from the clamping circuit, with the slice level to output a reference color burst having a rectangular waveform, a PLL circuit for generating a signal, having a frequency N·Fsc and phase-locked with the reference color burst by means of oscillation frequency control, to output the signal as a sampling clock to the A/D conversion circuit, a phase detection circuit for detecting the phase difference between the sampling clock and the reference color burst on the basis of the level difference between the output signal from the A/D conversion circuit and a predetermined phase reference value, and a signal conversion circuit for converting, for output, the output signal of the A/D conversion circuit into the color difference signal.

The sampling clock to be output from the PLL circuit to the A/D conversion circuit is a signal having a frequency N·Fsc and phase-locked with the color burst, and its phase can be adjusted to vary continuously according to phase reference value.

Thus, by setting the phase reference value so that the phase of the sampling lock takes a desired value, the A/D conversion circuit can be made to output the signal C with the color difference signal (e.g., –I, –Q, I, Q) in predetermined sequence. The signal conversion circuit converts the signal C output from the A/D conversion circuit (e.g., –I, –Q, I, Q) into individual color difference signals, I and Q, to be output.

Further, the demodulation being digital demodulation, the noise intrinsic to digital circuit will not occur. Moreover, since the adjustment by continuously varying the phase of the sampling clock is available, unnaturalness will not result from the chrominance demodulation and color tone adjustment.

Also, the signal conversion circuit is made to comprise a multiplier for multiplying, for output, the output signal of the A/D conversion circuit by –1 and a selection circuit for selectively outputting the output signal from the A/D conversion circuit and the output signal from the multiplier.

When arranged in this way, the composition of the signal conversion circuit can be simplified.

The reference color burst circuit is made to comprise a level comparator for comparing the output signal of the clamping circuit with the slice level to output a signal having a rectangular waveform and a burst-period sampling circuit for sampling the signal of the color burst period.

When arranged in this way, the composition of the reference color burst output circuit can be simplified.

The phase detection circuit is made to comprise an adder for adding the phase adjusting value for adjusting the color tone to the phase reference value, a comparator for comparing the sum of the adder with the output signal of the A/D conversion circuit during the period predetermined depending on the kind of input signal and a slice level output circuit for outputting a corresponding slice level on the basis of the output signal of the comparator.

This arrangement enables the color tone adjustment. Further, the phase detection circuit comprises the phase reference value selection circuit, for selectively outputting the predetermined phase reference value for NTSC signal or PAL signal by means of selection signal, the adder, for adding the color tone adjusting value to the phase reference value output from the phase reference value selection circuit, the comparator, for comparing the sum of the adder with the output signal from the A/D conversion circuit to output a signal corresponding to the level difference during the period predetermined depending on whether the input signal is of NTSC or of PAL, and the slice level output circuit, for outputting a corresponding slice level according to the output signal from the comparator.

The phase detection circuit arranged in this way not only enables the color tone to be adjusted but also is applicable to both the composite chrominance signal or chrominance signal of NTSC system and PAL (Phase Alternate) system.

The slice level output circuit is made to comprise a filter for smoothing, for output, the output signal of the comparator and a pulse width modulation circuit for outputting a corresponding pulse width modulation signal, as a slice level, on the basis of the output signal of the filter.

When arranged in this way, the composition of the slice level output circuit can be simplified.

BEST MODE FOR CARRYING OUT THE INVENTION

The embodiments of the present invention will be described in the following referring to attached drawings.

Figure 3:
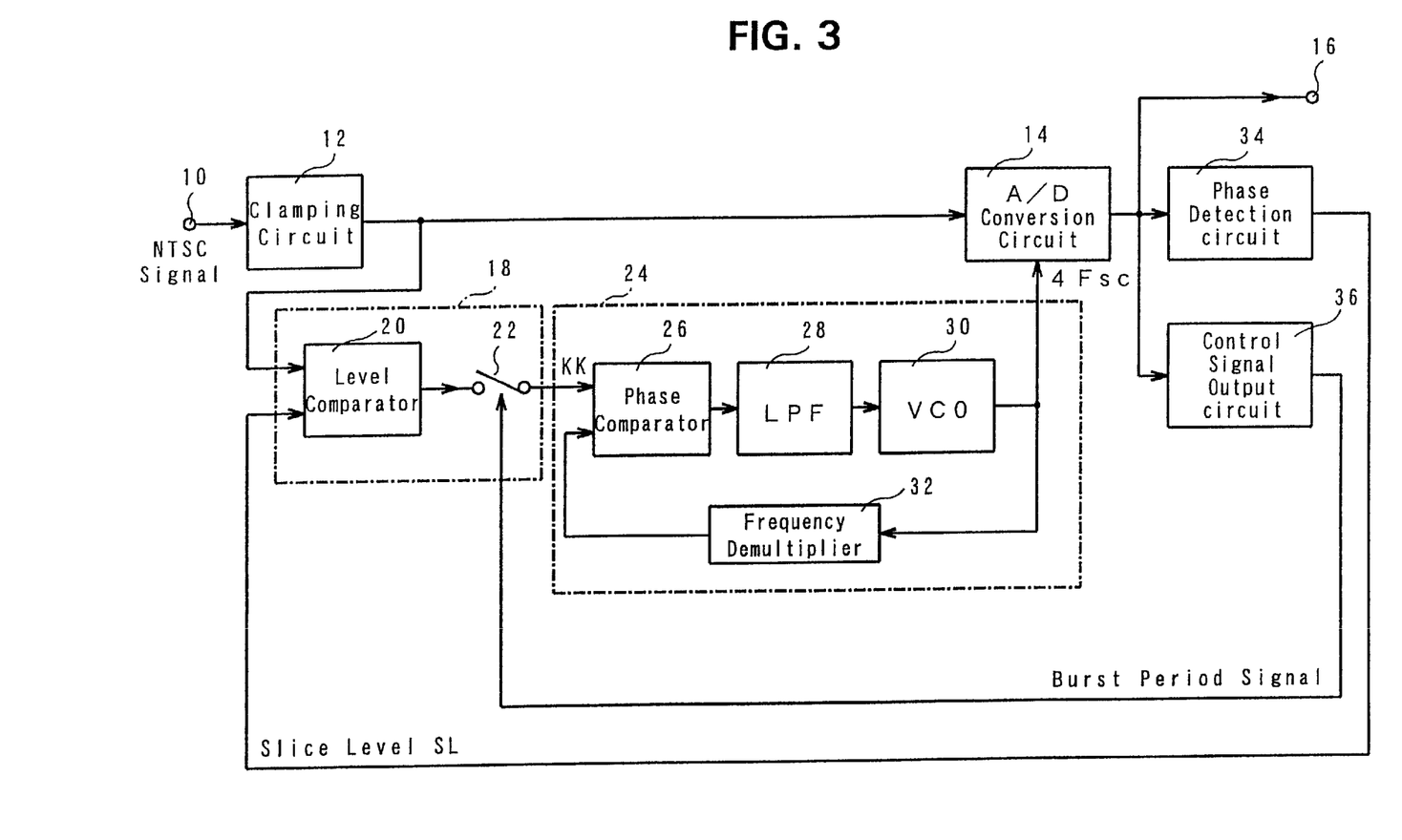
FIG. 3 a block diagram showing the dual-loop PLL circuit as an embodiment of the present invention.

FIG. 3 shows a dual-loop PLL circuit as an embodiment of the present invention, wherein the numeral 10 denotes an input terminal for inputting the NTSC signal as an analog composite chrominance signal; 12, a clamping circuit; 14, an A/D conversion circuit.

The clamping circuit 12 is designed to clamp, for output, the DC level of the NTSC signal, input to the input terminal 10, to a predetermined fixed level during the pedestal period of the NTSC signal, and the A/D conversion circuit 14 is designed to output, to the output terminal 16, the digital signal (e.g., carrier chrominance signal C) obtained by sampling the output signal from the clamping circuit 12 by means of the sampling clock.

The numeral 18 denotes a reference color burst output circuit, the reference color burst output circuit 18 comprising a level comparator 20 for comparing the output signal of the clamping circuit 12 with the slice level SL to output a signal having a rectangular waveform and a burst-period sampling circuit 22 for sampling the signal of the color burst period to be output as a reference color burst KK.

The numeral 24 denotes the PLL circuit comprising a phase comparator 26 for comparing the reference color burst KK, as being a reference signal, with the comparison signal to output a voltage corresponding to the phase difference, an LPF (Low Pass Filter) 28 for outputting, as a control signal, the low-frequency component of the output signal from the phase comparator 26, a VCO (Voltage-Controlled Oscillator) 30 for varying the oscillation frequency by the control signal from the LPF 28, and a frequency demultiplier 32 for demultiplying to ¼ the frequency of the output signal of the VCO 30 for output to the phase comparator 26, wherein the control signal output to the VCO 30 from the LPF 28 controls the oscillation frequency of the VCO 30 so that the phase difference between the color burst KK to be input to the phase comparator 26 and the comparison signal decreases to phase-lock the comparison signal with the reference color burst KK. When this phase-locking is made, the frequency of the sampling clock to be output to the A/D conversion circuit 14 from the VCO 30 becomes 4 Fsc.

The numeral 34 denotes a phase detection circuit, this phase detection circuit 34 detects the phase difference between the sampling clock and the reference color burst on the basis of the level difference between the output signal from the A/D conversion circuit and a predetermined phase reference value and outputs the slice level corresponding to the phase difference to the reference color burst output circuit 18.

The numeral 36 denotes a control signal output circuit, this control signal output circuit 36 detects the burst period from the output signal of the A/D conversion circuit and outputs the burst period signal, as a sampled control signal, to the burst period sampling circuit 22.

Figure 4:
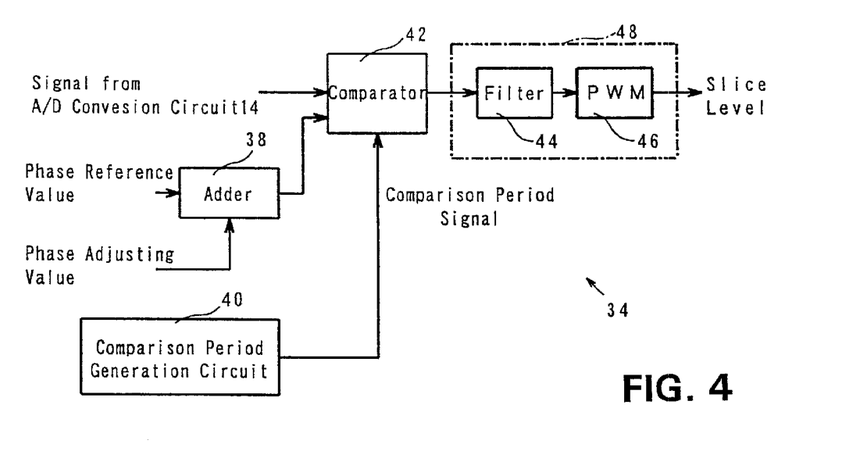
FIG. 4 is a block diagram showing the phase detection circuit shown in FIG. 3.

As shown in FIG. 4, the phase detection circuit 34 comprises an adder 38 for adding a phase adjusting value (e.g., a phase adjusting value for color tone) to the phase reference value (e.g., −0.2079) for NTSC, a comparison period generation circuit 40 for generating a comparison period signal corresponding to the phase comparison period for NTSC, a comparator 42 for comparing the output signal of the A/D conversion circuit 14 with the phase reference value output from the adder 38 to output a signal corresponding to the level difference, a filter 44 for outputting the low-frequency component of the signal output from the comparator 42 and a PWM circuit 46 for outputting the PWM (Pulse Width Modulation) signal, as the slice level, to the level comparator 20.

The filter 44 and the PWM circuit constitute a slice level output circuit 48.

Next, the operation of the present invention illustrated in FIG. 3 and FIG. 4 will be described in the following referring to FIG. 5 too.

(a) The NTSC signal input to input terminal 10 is clamped to a fixed level at which the DC level is constant during the pedestal period of a signal by means of the clamping circuit 12 and input to a level comparator 20 to be compared with a slice level SL, and the level comparator 20 outputs a signal having a rectangular waveform.

Figure 5:
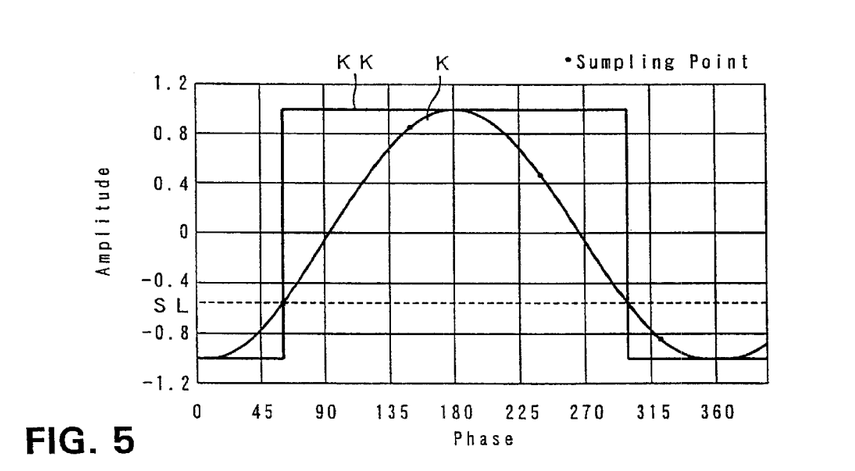
FIG. 5 is a waveform diagram of reference color burst KK output from the reference color burst output circuit shown in FIG. 3.

The burst period sampling circuit 22 samples the signal of color burst period out of the signals having a rectangular waveform, which are output from the level comparator 20, so that, when the phase of sampling clock, which will be described later, has a desired value, a reference color burst KK having a rectangular waveform, which is shown in FIG. 5, is output, as a reference signal, to PLL circuit 24.

In FIG. 5, x-axis represents the phase difference from phase reference point (B-Y axis), while y-axis represents amplitude, and K represents the color burst having the frequency Fsc.

The PLL circuit 24 generates, for output as a sampling clock to A/D conversion circuit 14, a signal having frequency of 4 Fsc (N=4) and which is phase-locked with the reference color burst KK output from reference color burst output circuit 18.

(b) The phase of the reference color burst KK output from the reference color burst output circuit 18 varies according to the slice level SL, and this slice level SL varies according to the phase reference value in phase detection circuit 34, so that the sampling clock can be adjusted to a desired value by continuously varying its phase according to the phase reference value by means of a signal having a frequency N·Fsc and phase-locked with the color burst KK.

In order to adjust the phase of the sampling clock, which is to be output to the A/D conversion circuit 14 from the PLL circuit 24, to a desired value (e.g., a value at which the phase difference from the phase reference point (B-Y axis) becomes 57°), the phase reference value is set to a corresponding value (e.g., −0.2079) while the phase adjusting value is set to 0, so that the phase of the reference color burst KK having a rectangular waveform takes a corresponding value.

When the phase reference value in the phase detection circuit 34 is set to aforementioned value (e.g., −0.2079), the slice level SL to be output from the phase detection circuit 34 will become a corresponding value (e.g., −0.5446).

(c) To make an adjustment (e.g., for color tone adjustment) for shifting a certain amount the phase of the sampling clock to be output to the A/D conversion circuit 14 from the PLL circuit 24, the phase adjusting value in the phase detection circuit 34 is set to a corresponding value, and the sum (an updated phase reference value) obtained by adding the phase adjusting value to the phase reference value in adder 38 is input, as a comparison value, to comparator 42. In this case, when the phase of the sampling clock is adjusted to a predetermined value (a value obtained by adding a certain value to a desired value), the level difference between the output signal from the A/D conversion circuit and the phase reference value also become corresponding values, and the slice level SL to be fed back to the reference burst output circuit 18 from the phase detection circuit 34 also varies to a corresponding value from the desired value (e.g., −0.5446).

The descriptions of the embodiments shown in FIG. 3 and FIG. 4 are concerned with the cases where the input signal is NTSC signal (an example of a composite chrominance signal), but the present invention is not limited to these embodiments.

For instance, the present invention is also applicable to the PAL signal, a system wherein the NTSC signal and PAL signal are convertible into each other, and the chrominance signal for either NTSC system or PAL system.

Figure 6:
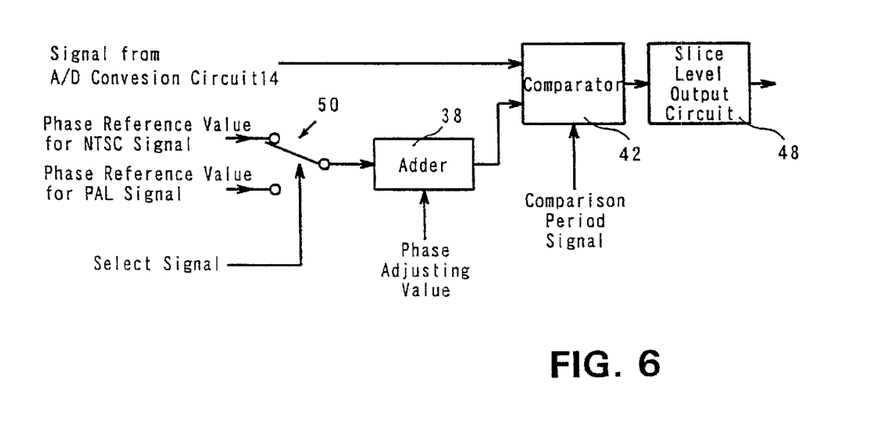
FIG. 6 is a block diagram showing another example of the phase detection circuit shown in FIG. 3.

For instance, as shown in FIG. 6, according to the present invention, a phase reference value selection circuit 50 may be provided in a stage preceding the stage of adder 38 within the phase detection circuit 34 so that, depending on whether the input signal is NTSC signal or PAL signal, the phase reference value (e.g., −0.0000) for NTSC signal or PAL signal can be selectively output to the adder 38.

Figure 7:
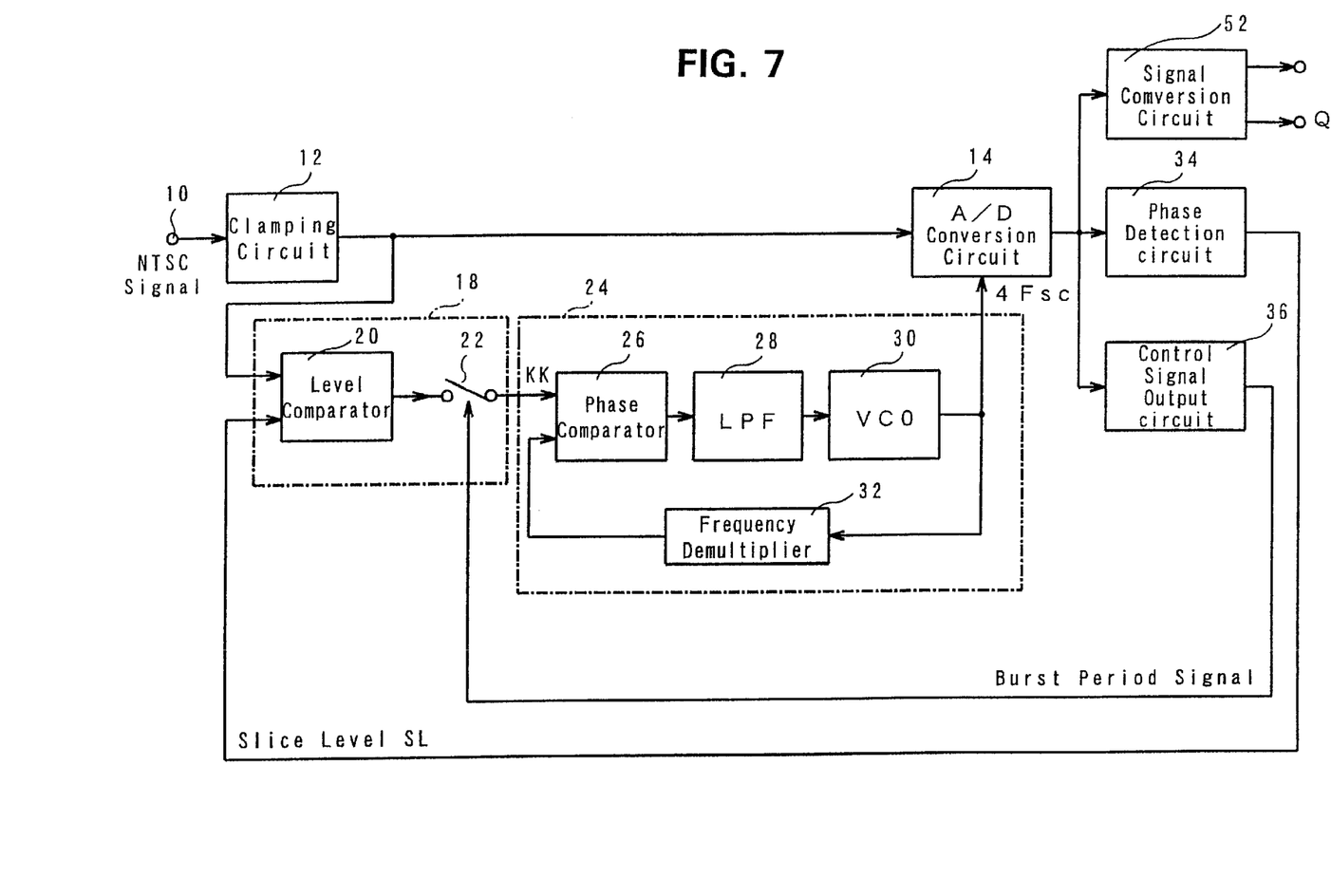
FIG. 7 is a block diagram showing the chrominance demodulation circuit as an embodiment of the present invention.
Figure 8:
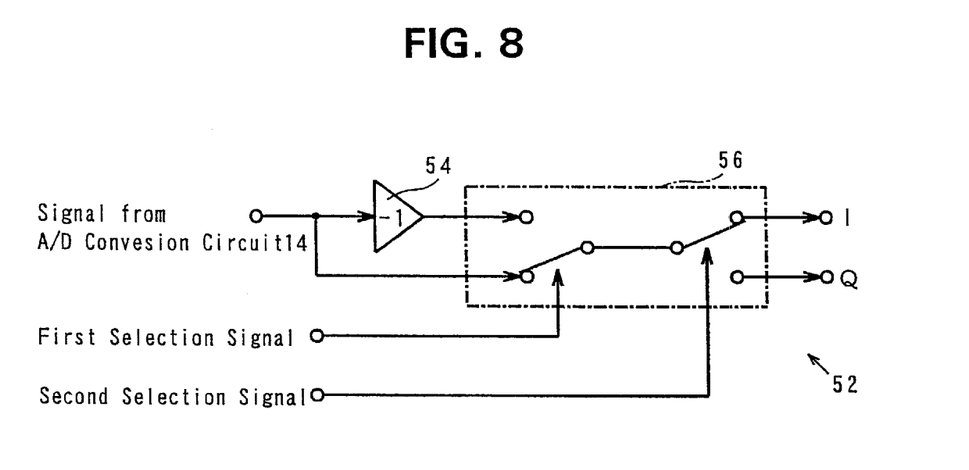
FIG. 8 is a block diagram showing the signal conversion circuit shown in FIG. 7.

FIG. 7 shows the chrominance demodulation circuit as an embodiment of the present invention, wherein the reference numerals of the parts common to those for the embodiment shown in FIG. 3 are omitted. In FIG. 7, the numeral 52 refers to signal conversion circuit designed to convert the output signal (e.g., signal C) from the A/D conversion circuit 14 into color difference signals I and Q. This conversion circuit 52, as shown in FIG. 8, comprises a multiplier 54 for multiplying the output signal of the A/D conversion circuit 14 by −1 for output and a selection circuit 56 for selectively outputting either the color difference signal I or Q by means of the first and second selection signals for output as individual color difference signals I and Q.

Figure 9:
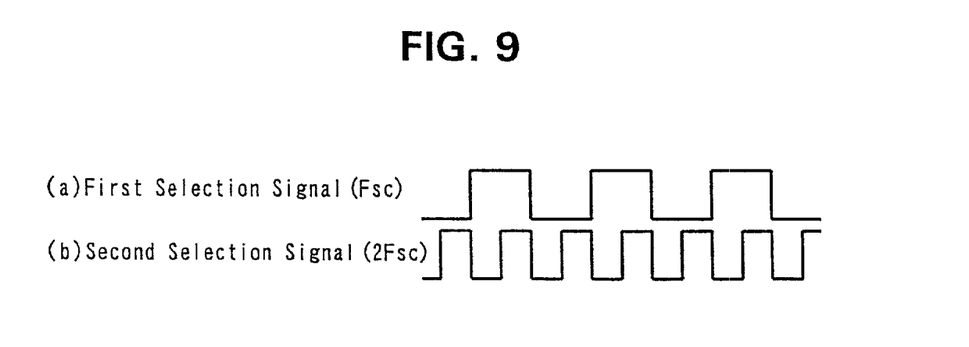
FIG. 9 is a waveform diagram of the first and the second selection signals to the selection circuit shown in FIG. 8.

Next, the operation of the present invention illustrated in FIG. 7 and FIG. 8 will be described referring to FIG. 9.

When the phase of the sampling clock to be output to the A/D conversion circuit 14 from the PLL circuit 24 is adjusted to a desired value (e.g., a value at which the phase difference from the phase reference value (B-Y axis) is 57°) by setting the phase reference value in the phase detection circuit 34 to a value for NTSC (e.g., −0.2079), while the phase adjusting value is set to 0, similarly to the cases shown in FIG. 3 and FIG. 4, the level difference between the output signal of the A/D conversion circuit 14 and the phase reference value becomes the set value, while the slice level SL to be fed back to the reference color burst output circuit 18 from the phase detection circuit 34 becomes a corresponding value (e.g., −0.5446), and the phase of the rising point of the reference color burst KK becomes a corresponding value (e.g., 57° from the phase reference point). Therefore, the output signal of the A/D conversion circuit 14 becomes a chrominance signal, with which the color difference signal changes in the order of −I, −Q, I and Q with the timing of the frequency 4 Fsc.

The selection circuit 56 makes a selection by means of the first selection signal (frequency: Fsc) shown as (a) in FIG. 9 for the selection in the preceding stage, while making a selection by means of the second selection signal (frequency: 2 Fsc) shown as (b) in the same figure in the subsequent stage, to output the color difference signals I and Q individually.

Further, similarly to the cases shown in FIG. 3 and FIG. 4, the phase difference from the phase reference point of the sampling clock can be varied continuously by varying the phase reference value and/or the phase adjusting value in the phase detection circuit 34, so that the phase shift resulting from signal delay in the level comparator 20 or A/D conversion circuit 14 can be adjusted by adjusting the phase reference value and/or by adjusting the phase adjusting value.

Further, when adjusting the color tone by shifting a certain amount the phase of the sampling clock to be output from the PLL circuit 24 to the A/D conversion circuit 14, the phase adjusting value in the phase detection circuit 34 is set to a corresponding value, and the sum (an updated phase reference value) obtained by adding the phase adjusting value to the phase reference value by the adder 38 is input, as a comparison value, to the comparator 42. In this case, when the phase of the sampling clock is adjusted to a predetermined value (a value obtained by adding a certain value to the desired value), the level difference between the output signal of the phase detection circuit 14 and the phase reference value also varies to a corresponding value, while the slice level SL to be fed back to the reference color burst output circuit 18 from the phase detection circuit 34 also varies to a corresponding value.

Therefore, the sampling clock to be output to the A/D conversion circuit 14 from the PLL circuit 24 is a signal having frequency 4 Fsc, this signal being a signal phase-locked with the reference color burst KK at its slice level SL (a value corresponding to the sum of the phase reference value and the phase adjusting value), while the color difference signals, I and Q, vary according to the value corresponding to the phase adjusting value to adjust the color tone.

The embodiment shown in FIG. 7 is concerned with an arrangement wherein the phase detection circuit as is shown in FIG. 4 is designed for enabling the phase reference value for NTSC signal to be added to the phase adjusting value for color tone adjustment, but the present invention is not limited this embodiment and is applicable either to a case where the phase detection circuit is not provided with the function for adding the phase adjusting value though being capable of using only the phase reference value for the NTSC signal or to a case where either the phase reference value for NTSC signal or PAL signal can be selected.

INDUSTRIAL AVAILABILITY

As discussed in the foregoing, the dual-loop PLL circuit according to the present invention is capable of not only converting the sampling clock to be output to the A/D conversion circuit from the PLL circuit into a signal having frequency N·Fsc and phase-locked with the color burst but also continuously varying the phase of the signal according to the phase reference value. Therefore, for instance, by adjusting the phase of the reference color burst at its rising point so that its phase difference from the phase reference point become 57°, the sampling clock for A/D conversion suited for chrominance demodulation can be output.

Further, the chrominance demodulation circuit using the dual-loop PLL circuit according to the present invention is capable of converting the output signal of the A/D conversion circuit into the color difference signal (e.g., I, Q); therefore, the circuit can be used for demodulating the color difference signal from the composite chrominance signal easily and with a high accuracy.

What is claimed is:

1. A dual-loop PLL circuit comprising a clamping circuit for clamping the DC level of a composite chrominance signal or a chrominance signal to a certain fixed level for output, an A/D conversion circuit for sampling the output signal from the clamping circuit by a sampling clock to output a digital signal, a reference color burst output circuit for comparing a color burst having a frequency of Fsc, Fsc: Frequency of a chrominance sub-carrier, out of the output signal of the clamping circuit, with a slice level for outputting a reference color burst having a rectangular waveform, a PLL circuit for generating a signal, having a frequency of N·Fsc, N=integral number of times of 4, and phase-locked with a reference color burst by an oscillation frequency control, for being output as a sampling clock to said A/D conversion circuit, and a phase detection circuit for detecting the phase difference between the sampling clock and the reference color burst on the basis of the difference between the output signal of said A/D conversion circuit and the level of predetermined phase reference value and for outputting the slice level corresponding to the phase difference to said reference color burst output circuit.

2. A dual-loop PLL circuit according to claim 1, wherein the reference color burst output circuit comprises a comparator for comparing the output signal of the clamping circuit with the slice level to output a signal having a rectangular waveform and a burst period sampling circuit for sampling a signal of a color burst period from an output signal of a level comparator.

3. A dual-loop PLL circuit according to claim 1, wherein the phase detection circuit comprises an adder for adding a phase adjusting value to the phase reference value, a comparator for comparing the sum of the adder with the output signal of the A/D conversion circuit during a period predetermined according to the kind of input signal to output a signal corresponding to the level difference and a slice level output circuit for outputting a slice level according to an output signal of a comparator.

4. A dual-loop PLL circuit according to claim 1, wherein the phase detection circuit comprises a phase reference value selection circuit, for selectively outputting a predetermined phase reference value for an NTSC signal or PAL signal selected by means of a selection signal, an adder for adding a phase adjusting value to the phase reference value output from the phase reference value selection circuit, a comparator for comparing the sum of the adder with the output signal from the A/D conversion circuit to output a signal corresponding to a level difference during the period predetermined depending on whether the input signal is of NTSC or of PAL, and a slice level output circuit for outputting a corresponding slice level according to an output signal from the comparator.

5. A dual-loop PLL circuit according to claim 3, wherein the slice level output circuit comprises a filter for smoothing the output signal from the comparator for output and a pulse width modulation circuit for outputting a corresponding pulse width modulation signal as a slice level, according to an output signal of the filter.

6. A dual-loop PLL circuit according to claim 4, wherein the slice level output circuit comprises a filter for smoothing the output signal from the comparator for output and a pulse width modulation circuit for outputting a corresponding pulse width modulation signal as a slice level, according to an output signal of the filter.

7. A chrominance demodulation circuit comprising a clamping circuit for clamping, for output, a DC level of an input composite chrominance signal or chrominance signal to a predetermined fixed level, an A/D conversion circuit for sampling an output signal from the clamping circuit by means of a sampling clock to output the sampled signal as a digital signal, a reference color burst output circuit for comparing a color burst having a frequency of Fsc, Fsc: Frequency of a chrominance sub-carrier, out of an output signal from said clamping circuit with a slice level to output a reference color burst having a rectangular waveform, a PLL circuit for generating a signal, which has a frequency of N·Fsc, N=integral number of times of 4, and is phase-locked with the color burst by oscillation frequency control, to output the generated signal as a sampling clock to said A/D conversion circuit, a phase detection circuit for detecting a phase difference between the sampling clock and the reference color burst on the basis of a level difference between the output signal from said A/D conversion circuit and a predetermined phase reference value, and a signal conversion circuit for converting the output signal from said A/D conversion circuit into a color difference signal to be output.

8. A chrominance demodulation circuit according to claim 7, wherein the signal conversion circuit comprises a multiplier for multiplying the output signal from said A/D conversion circuit by −1 for output and a selection circuit for selectively outputting the output signal from said A/D conversion circuit or an output signal from said multiplier.

9. A chrominance demodulation circuit according to claim 7, wherein the reference color burst output circuit comprises a level comparator for comparing the output signal of the clamping circuit with the slice level to output a signal having a rectangular waveform and a burst period sampling circuit for sampling a signal of a burst period out of the signal output from the level comparator.

10. A chrominance demodulation circuit according to claim 7, wherein the phased detection circuit comprises an adder for adding a phase adjusting value for color tone adjustment to the phase reference value, a comparator for comparing a sum from said adder with the output signal of the A/D conversion circuit during a period predetermined according to the kind of input signal to output a signal corresponding to the level difference and a slice level output circuit for outputting a corresponding slice level on the basis of the output signal from the comparator.

11. A chrominance demodulation circuit according to claim 9, wherein the phased detection circuit comprises an adder for adding a phase adjusting value for color tone adjustment to the phase reference value, a comparator for comparing a sum from said adder with the output signal of the A/D conversion circuit during a period predetermined according to the kind of input signal to output a signal corresponding to the level difference and a slice level output circuit for outputting a corresponding slice level on the basis of the output signal from the comparator.

12. A dual-loop PLL circuit according to claim 7, wherein the phase detection circuit comprises a phase reference value selection circuit for selectively outputting a predetermined phase reference value for an NTSC signal or PAL signal selected by means of a selection signal, an adder for adding a phase adjusting value for adjusting a color tone to a phase reference value output from a phase reference value selection circuit, a comparator for comparing a sum from the adder with the output signal of the A/D conversion circuit during a period predetermined depending on whether an input signal is NTSC or PAL to output a signal corresponding to a level difference, and a slice level output circuit for outputting a corresponding slice level according to the output signal of the comparator.

13. A dual-loop PLL circuit according to claim 9, wherein the phase detection circuit comprises a phase reference value selection circuit for selectively outputting a predetermined phase reference value for NTSC signal or PAL signal selected by means of a selection signal, an adder for adding a phase adjusting value for adjusting a color tone to a phase reference value output from a phase reference value selection circuit, a comparator for comparing a sum from the adder with the output signal of the A/D conversion circuit during the period predetermined depending on whether the input signal is NTSC or PAL to output a signal corresponding to a level difference, and a slice level output circuit for outputting a corresponding slice level according to the output signal of the comparator.

14. A chrominance demodulation circuit according to claim 10, wherein the slice level circuit comprises a filter for smoothing, for output, the output signal from the comparator and a pulse width modulation circuit for outputting, as a slice level, a corresponding pulse width modulation signal on the basis of an output signal from the filter.

15. A chrominance demodulation circuit according to claim 11, wherein the slice level circuit comprises a filter for smoothing, for output, the output signal from the comparator and a pulse width modulation circuit for outputting, as a slice level, a corresponding pulse width modulation signal on the basis of an output signal from the filter.

16. A chrominance demodulation circuit according to claim 12, wherein the slice level circuit comprises a filter for smoothing, for output, the output signal from the comparator and a pulse width modulation circuit for outputting, as a slice level, a corresponding pulse width modulation signal on the basis of an output signal from the filter.

17. A chrominance demodulation circuit according to claim 13, wherein the slice level circuit comprises a filter for smoothing, for output, the output signal from the comparator and a pulse width modulation circuit for outputting, as a slice level, a corresponding pulse width modulation signal on the basis of an output signal from the filter.

* * * * *